(12) United States Patent
Augst

(10) Patent No.: US 8,749,404 B2
(45) Date of Patent: Jun. 10, 2014

(54) MOTOR VEHICLE

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 987 days.

(21) Appl. No.: 12/618,987

(22) Filed: Nov. 16, 2009

(65) Prior Publication Data

US 2010/0060487 A1    Mar. 11, 2010

Related U.S. Application Data

(63) Continuation of application No. PCT/EP2008/002460, filed on Mar. 28, 2008.

(30) Foreign Application Priority Data

May 14, 2007 (DE) .......................... 10 2007 022 524

(51) Int. Cl.
*G08G 1/017* (2006.01)
*G08G 1/054* (2006.01)

(52) U.S. Cl.
USPC ............................. 340/937; 340/436; 382/103

(58) Field of Classification Search
CPC .......... G08G 1/04; G08G 1/16; G01S 17/026; G01S 19/931; G01B 11/022; B60R 1/00; B62D 1/00; G06K 9/3241; G06K 9/00798
USPC .................... 340/937, 903; 382/101
See application file for complete search history.

(56) References Cited

U.S. PATENT DOCUMENTS

| | | | | |
|---|---|---|---|---|
| 5,850,254 A | * | 12/1998 | Takano et al. | 348/148 |
| 6,038,496 A | | 3/2000 | Dobler et al. | |
| 6,285,778 B1 | | 9/2001 | Nakajima et al. | |
| 6,985,075 B2 | * | 1/2006 | Takeda | 340/435 |
| 7,287,884 B2 | * | 10/2007 | Koike | 340/435 |
| 7,747,039 B2 | * | 6/2010 | Fujimoto | 340/435 |
| 2006/0182365 A1 | | 8/2006 | Park et al. | |

FOREIGN PATENT DOCUMENTS

| | | |
|---|---|---|
| DE | 30 21 448 A1 | 12/1981 |
| DE | 195 07 957 C1 | 9/1996 |
| DE | 197 38 321 A1 | 3/1999 |
| DE | 102 26 278 A1 | 12/2003 |
| DE | 10 2004 049 054 A1 | 4/2006 |

OTHER PUBLICATIONS

Radu Orghidan et al., "Modelling and Accuracy Estimation of a New Omnidirectional Depth Computation Sensor", Pattern Recognition Letters, Elsevier, Amsterdam, NL, vol. 27, No. 7, pp. 843-853, May 1, 2006.

International Search Report dated Jul. 28, 2008, with English translation (six (6) pages).

(Continued)

*Primary Examiner* — Eric M Blount
(74) *Attorney, Agent, or Firm* — Crowell & Moring LLP

(57) ABSTRACT

A motor vehicle has an imaging device for generating an image of a radiation pattern on the terrain surrounding the motor vehicle. A detecting device is provided for the multiple sequential detection of images of the radiation patterns that are influenced by the terrain. A processor device is also provided. The processing device is designed such that an obstacle in the terrain is detected based on the difference between directly or indirectly sequentially detected images of the radiation pattern.

17 Claims, 5 Drawing Sheets

(56) References Cited

OTHER PUBLICATIONS

German Search Report dated Sep. 17, 2007, with Partial English translation (nine (9) pages).
European Search Report dated Apr. 22, 2013 with statement of relevancy (Six (6) pages).
Nishi et al., "Collision Avoidance System Using Laser Beams", Master Course of Techno-Business Administration, Nagoya Institute of Technology, Japan, Toyota Motor Corporation, Six pages.
Sobottka et al., "Towards Smarter Cars", Institute of Computer Science and Applied Mathematics, University of Bern, Switzerland, pp. 120-139, 1999.

* cited by examiner

MOTOR VEHICLE

CROSS-REFERENCE TO RELATED APPLICATIONS

This application is a continuation of PCT International Application No. PCT/EP2008/002460, filed Mar. 28, 2008, which claims priority under 35 U.S.C. §119 to German Patent Application No. DE 10 2007 022 524.7, filed May 14, 2007, the entire disclosures of which are herein expressly incorporated by reference.

BACKGROUND AND SUMMARY OF THE INVENTION

The invention relates to a motor vehicle. From U.S. Pat. No. 6,285,778, a detector for the motor vehicle environment is known by which a two-dimensional matrix pattern, particularly a dot matrix, is projected into an area to be observed, and the corresponding light pattern is photographed. A comparison between the photographed light pattern and a stored reference pattern, which corresponds to the light pattern on a flat road, forms the basis of the recognition of obstacles.

This solution has several disadvantages. In order to generate a two-dimensional light pattern that is used for the detection of obstacles in a certain area, it must be radiated onto the entire surface to be sensed. A relatively high luminous power is required for this purpose. Small obstacles between the dots of the light pattern may remain undetected. The assignment of the detected position of the dots to the desired positions is problematic in the case of larger obstacles. In addition, the comparison between the photographed surface-covering two-dimensional light pattern and the stored two-dimensional reference pattern for the detection of obstacles is computationally intensive. An unambiguous assignment of the individual dots in the photographed light pattern to their corresponding desired positions is not always possible. When the patterns of two adjacent vehicles with the same system overlap, the light patterns of one vehicle may overlap those of the other vehicle. No meaningful possibility is indicated to integrate the system in the motor vehicle.

It is therefore an object of the invention to provide a technical teaching for recognizing obstacles in the environment of a vehicle that can be implemented in an economical fashion.

This object is achieved in accordance with the invention. Advantageous further developments of the invention are described herein.

A motor vehicle according to the invention includes (a) an imaging device for generating an image of a radiation pattern in the environment of the motor vehicle, (b) a detecting device for the multiple, sequential detection of images of the radiation pattern influenced by the environment, and (c) a processor device which is arranged such that, based on the difference between directly or indirectly sequentially detected images of the radiation pattern, an obstacle or a turn in the road is detected in the environment.

As a result of the fact that obstacle recognition is based on a difference between successively detected images of the radiation pattern, the obstacle recognition can easily be implemented. A reference pattern that was stored beforehand during manufacturing is not absolutely necessary but may nevertheless be provided for additional purposes. The invention can thereby be put into practice in an economical fashion. As a result, the reliability of obstacle detection can also be improved.

In this case, the imaging device may include an electromagnetic radiation source, such as a laser, for in particular visible radiation or infrared radiation and/or a suitable imaging lens system, for example, a cylindrical lens, for generating a continuous line as a radiation pattern.

The radiation pattern is preferably further developed in an essentially stripe-shaped fashion, for example, as a curved line or as a boundary consisting of several segments. According to a preferred further development, the imaging device is arranged such that the image of the radiation pattern forms an essentially closed ring around the motor vehicle. As an alternative to the above, the radiation pattern surrounds the motor vehicle partially.

As a result, an image of the radiation pattern can be generated repeatedly in a reliable manner with low hardware expenditures and power expenditures. The detection of images of the radiation pattern, and of differences between images and thus of obstacles, can be reliably carried out at low computing expenditures.

It is advantageously provided that the detecting device, which detects the image of, for example, the lines in the environment of the vehicle, is synchronized with the corresponding radiation source. A power-saving pulsed operation is thereby made possible.

The detecting device may, for example, be a digital camera adapted to the wavelength of the imaging device, particularly its radiation source. There may, for example, be between 10 milliseconds and 3 seconds between directly sequential detections of the image of the radiation pattern. The in-between time may depend on the current vehicle speed, for example, such that, in each case, with a movement of the motor vehicle by 0.1 meters, the detection of an image of the radiation pattern is triggered automatically.

When the radiation pattern is recognized by the processor device, the segmentation in the sense of the image processing is preferably carried out by use of the special characteristics of the radiation pattern, such as the luminosity, the wavelength and/or the line width.

An electronic obstacle map is advantageously prepared by use of the obtained information. This electronic obstacle map can be changed to a form that can easily be interpreted by the driver of the vehicle and can be displayed, for example, on the vehicle video screen or a heads-up display. Based on the detection of an obstacle, a visual or acoustic warning signal can be emitted.

It is preferably provided that, on the basis of the curvature of the radiation pattern at the obstacles, not only their distance and the direction relative to the coordinate system of the motor vehicle are determined but, by means of a comparison of several chronologically successive detections, their relative speeds with respect to the vehicle coordinates are also computed.

The speed of the obstacles relative to the road can advantageously be computed from the relative speed of the obstacles in the coordinates of the vehicle and from the knowledge of the vehicle speed relative to the road. In this manner, a motor vehicle can differentiate between static obstacles, such as road boundaries, and the mobile obstacles, for example, a pedestrian who wants to cross the road in front of the vehicle. This differentiation is of essential significance when designing algorithms, for example, for avoiding collisions, for the protection of pedestrians, and/or for pre-crash algorithms.

The vehicle dynamics of the motor vehicle can preferably be influenced by the obtained information concerning the environment of the motor vehicle. This may be further developed as an automatic braking in front of obstacles if these are situated in the precalculated trajectory of the vehicle, and/or as an evasion with respect to recognized obstacles.

Particularly preferably, the imaging device includes an infrared laser beam device, which is further developed with a special lens system which optically transforms the laser beam such that, from its installed position in the motor vehicle, aimed at a straight road that is free of obstacles, the laser beam generates a straight or curved line. A curved cylindrical lens can, for example, be used as the optical device.

As an alternative to the above, a laser beam can be caused to carry out a rapid movement by way of a rotating mirror or, for example, by way of an optical element moved by a piezoelectric transducer, so that the one-dimensional laser beam generates a two-dimensional figure in the environment of a motor vehicle.

The imaging device is preferably set up such that, when it is assumed that an environment does not change relative to the motor vehicle, the image of the radiation pattern rests in the coordinate system of the vehicle or is moved along with the motor vehicle. In contrast to the known LIDAR technology, no precise controlled deflection of the beam in two directions is therefore required for the obstacle recognition. The radiation pattern moves together with the vehicle. The points-in-time for the detection of the current image of the radiation pattern can be automatically computed from the movement of the vehicle, which is detected, for example, by way of wheel sensors. As a result, it is also not absolutely necessary to expose the vehicle environment in a surface-covering manner to a dot matrix radiation and to sense it. The required information concerning the position, the size and, if required, the inherent speed of the motor vehicle can be obtained by means of the inherent speed of the vehicle or a rotation of the door during the opening as soon as these are impacted by the radiation pattern.

The recognition of an obstacle is preferably based on the comparison of the displacement of the image of the radiation pattern and the displacement of other textures and/or edges in the image of the environment detected by the detecting device. It is preferably provided that the presence of obstacles can be assumed if a clearly deviating displacement or curvature of the image of the radiation pattern relative to the edges extracted from the detected image of the environment takes place at certain points of the detected image.

The imaging device and the detecting devices are preferably arranged at a distance from one another. Only in this case can the change of the shape of the image of the radiation pattern be detected due to obstacles. In particular, the imaging device and the detecting device are arranged above one another and, in the vertical direction, are arranged at a mutual distance of, for example, 10 cm.

Preferably in the case of a locked vehicle, a threat of theft or vandalism can be assumed based on the difference between indirectly or directly sequentially (chronologically successively) detected images of the radiation pattern, and a corresponding warning signal is generated, which can be emitted, for example, visually and/or acoustically directly at the motor vehicle or is emitted after a message transmission from the vehicle to a remote unit, for example by way of a mobile radio system at the remote unit.

As a result of a relatively low power consumption of the device in comparison to the systems that require a clearly stronger illumination of the environment, the system can operate particularly in a pulsed operation as a replacement or support of an antitheft warning system.

By means of the detected change of the image of the radiation pattern, such as a line, from one pulse timing to the next, preferably not only the violation of a safety zone is determined but an object classification is also carried out. For example, the approach of a pedestrian can be automatically differentiated from the approach of another motor vehicle because these approaches result in different curvatures of the safety ring. Such a further development has an advantage in comparison to a conventional antitheft warning system which cannot carry out a classification of the objects.

A preferred further development provides that a radiation pattern assigned to the motor vehicle or originating from the motor vehicle or the pertaining imaging device is recognized or can be separated from the radiation pattern of another vehicle in that the detected image corresponds to the generated image with respect to its shape, particularly with respect to its curvature (convex or concave).

A clear differentiability of the image of the radiation pattern of the own vehicle from the perspective of its detecting device from the image of the radiation pattern of another vehicle with the same system offers a significant advantage with respect to the known state of the art.

Advantageously, the imaging device, particularly for the sections of the environment situated laterally with respect to the vehicle, can be cost-effectively and functionally built into a door handle, for example, together with the front end area lighting unit of the vehicle. The detecting device, particularly for the sections of the environment situated laterally with respect to the vehicle, can preferably be built into a lateral mirror of the motor vehicle. For the detection and further processing of the image of the radiation pattern, an existing top view camera system can be used or can be built in together with the latter. The top view camera preferably is a system for displaying to the driver a geometrically transformed camera image of sections of the environment situated laterally with respect to the vehicle. The imaging device for the forward area of the vehicle is preferably cost-effectively and functionally built into a decorative element, for example, a manufacturer's emblem. In this case, the radiation pattern can be deflected, for example, by way of a mirror and/or prism which, in particular, can be hinged.

The deflection of the radiation pattern in a mirror is very advantageous, particularly with respect to better meeting the safety standard for the use of the laser technique in the motor vehicle. As a result, the exit lens system of the laser can be built into the interior of the vehicle in a manner not accessible from the outside. It is therefore not possible to look directly into the exit lens system which, in the case of a relatively high emitted power, could result in possible damage to the retina. The radiation reflected in a deflecting mirror, which according to the invention is emitted, for example, as a line into the environment of the vehicle, is even largely harmless when looking directly into the mirror because, at a certain distance from the lens system, the radiant power is already relatively widely fanned out and can generate a much lower luminous power per unit of surface, for example, on the retina.

Advantageously, a further development of a forward-directed camera system of the vehicle, such as a lane departure warning system, can be used in a cost-effective and functional manner as the detecting device for an area situated in front of the vehicle. The detecting device is preferably constructed in a cost-effective and functional manner as a further development of a backup camera for areas situated behind the vehicle. Since the above-mentioned camera systems already have high-power image processing units, the invention or its further developments can be implemented at low expenditures.

Particularly when the imaging device and/or the detecting device is integrated in a side mirror of the motor vehicle, it is preferably provided that, based on the difference between sequentially detected images of the radiation pattern, an obstacle is detected which hinders the opening of a vehicle door.

Particularly preferably, it is provided that the time between the sequential generation of images of the radiation pattern and/or the successive detections of images of the radiation pattern influenced by the environment depends on the vehicle movement, for example, such that repeatedly, after a movement of the vehicle by a predefined distance of, for example, 10 to 50 centimeters, a generating of an image and/or a detecting of an image is triggered. The measuring of the predefined distance can be carried out, for example, by use of wheel sensors present in the vehicle. Additionally, the distance between two neighboring detections of the environment can be made dependent on the current speed range of the vehicle. As a result, parking and maneuvering with high demands on the precision of the obstacle detection and a detection of the environment, for example, for pre-crash applications for the higher speed range, can be supported by higher demands on the real-time cap ability.

Preferably, based on sequentially detected images of the radiation pattern, the time between the sequential detection of the images and the vehicle speed, information concerning the vehicle environment, particularly concerning the presence, the size, the shape and the relative speed of the obstacles in the environment of the vehicle, is obtained, which can be further processed as the basis of the triggering of automatic warning functions and/or the intervention in the dynamics of a vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
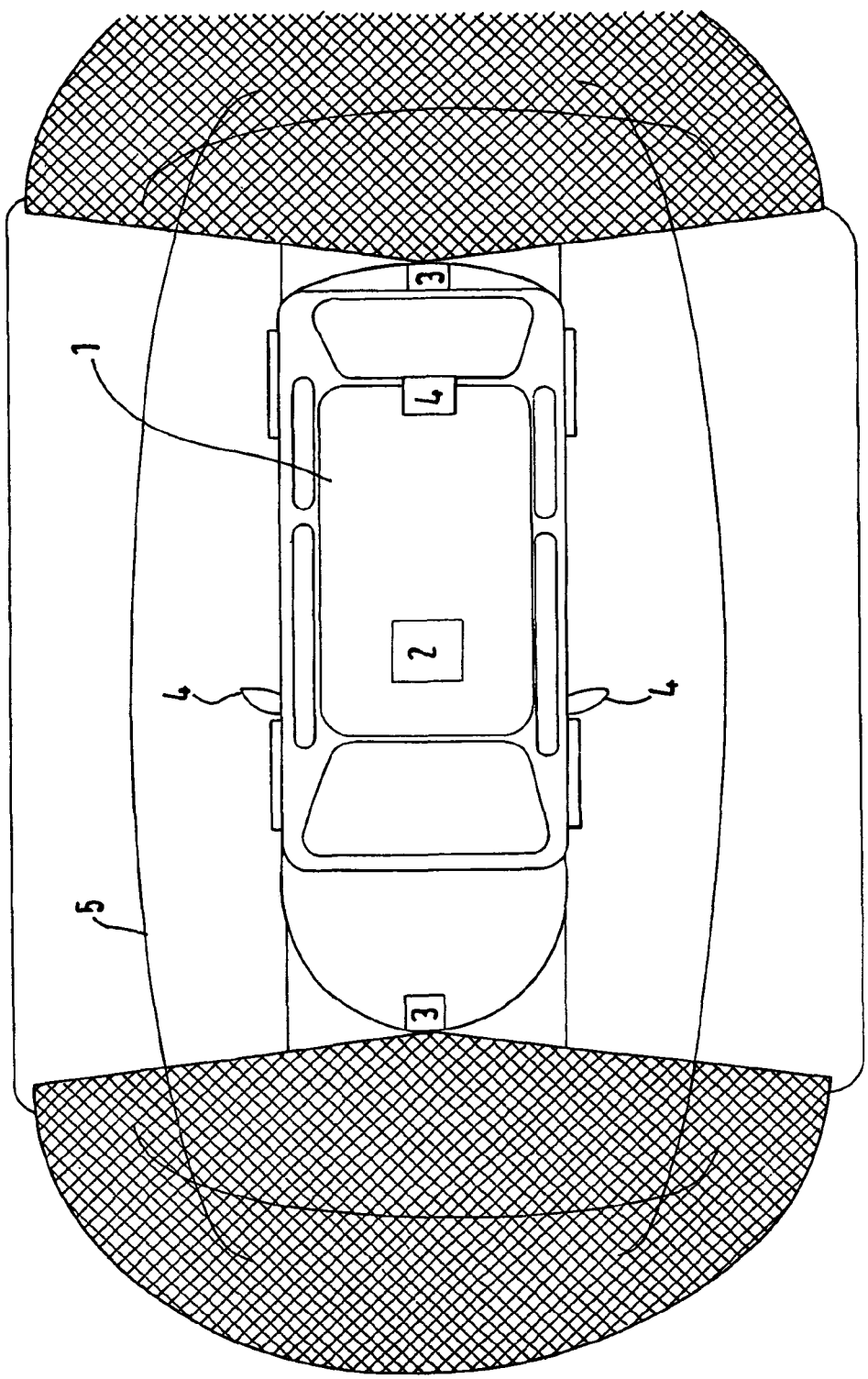
FIG. 1 is a schematic representation of a motor vehicle together with the safety ring without an obstacle.

FIG. 1 is a schematic top view of a motor vehicle 1 having a processor device 2 and an imaging devices coupled therewith 3 (may consist of several partial devices) and a detecting device 4 coupled therewith (may consist of several partial devices). The imaging device 3 generates a line 5 around the motor vehicle as the image of a radiation pattern. By means of the detecting device 4, several images 5 or partial images (when several partial detecting devices are used) influenced by the vehicle environment of the radiation pattern are sequentially in time detected (as required, using an image fusion when several partial detecting devices are used).

The processor device 2, which may contain an image processing device, is further developed such that, based on the difference between sequentially (chronologically successively) detected images of the radiation pattern, an obstacle is detected in the terrain.

Figure 2:
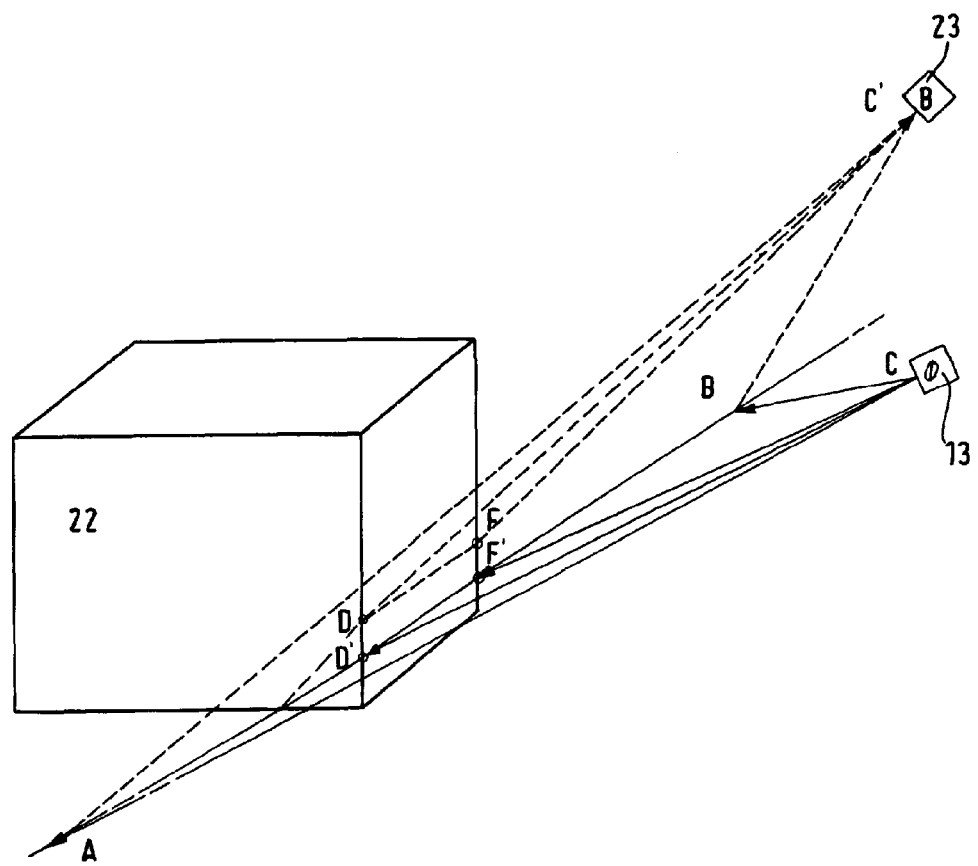
FIG. 2 is a schematic representation of the obstacle recognition.

FIG. 2 illustrates the principle behind the obstacle recognition. From Point C, the imaging device 13 projects a line AB into the environment of the motor vehicle. The line impinges on the obstacle 22. From the perspective C', the detecting device 23 records the curvature in that the partial section of the detected lines DF has shifted toward Points D'F' in comparison to the preceding picture.

If the difference, for example, the maximal displacement, between chronologically (indirectly or directly) successively detected images in the coordinate system of the motor vehicle exceeds a predefined threshold, it is assumed that an obstacle is present.

As a result of the information concerning the movement of the motor vehicle and the change of curvature between two or more image detections, the height of the obstacles (or possibly the depth of potholes) can be calculated. In addition, the movement vector of an object movable, for example, transversely with respect to the vehicle can be measured if the amount of its intersection with the safety ring is displaced transversely to the driving direction.

In the case of an object that is moving transversely to the precalculated driving path of the vehicle, and in the case of a curvature of the lines which indicate, for example, the shape and movement characteristics of human legs, the system can automatically recognize a pedestrian who, for example, is crossing the precalculated trajectory of the vehicle. In this case, the system can emit a warning to the driver and/or initiate an automatic or partially automatic braking operation or an automatic or partially automatic evasive maneuver.

In addition to the described automatic detection and processing of an image of the radiation pattern, the detected image can also be shown on a display of the vehicle and/or, if the radiation pattern is based on visible rays, can be directly observed by a vehicle user in the mirror or camera picture. Also, when a side of the vehicle is not illuminated, he can thereby notice the approach to a dark obstacle during the maneuvering by the change of the shape of the radiation pattern. The device can, for example, also be used for the precise positioning of the motor vehicle, for example, parallel and at a predefined distance next to the edge of the sidewalk or next to another vehicle.

An embodiment, which is not shown, provides several safety zones, which each cover different areas around the motor vehicle. Thus, a differentiation can be made, for example, between a "dangerous close area" (an area of a width of one meter directly around the vehicle) and a "moderately dangerous close area" (an area of a width of two meters directly around the vehicle), in which case the radiation patterns of the two areas may differ with respect to color/wavelength and/or shape of the radiation pattern (for example, line, double line or dash-dotted line) for better differentiability.

Figure 3:
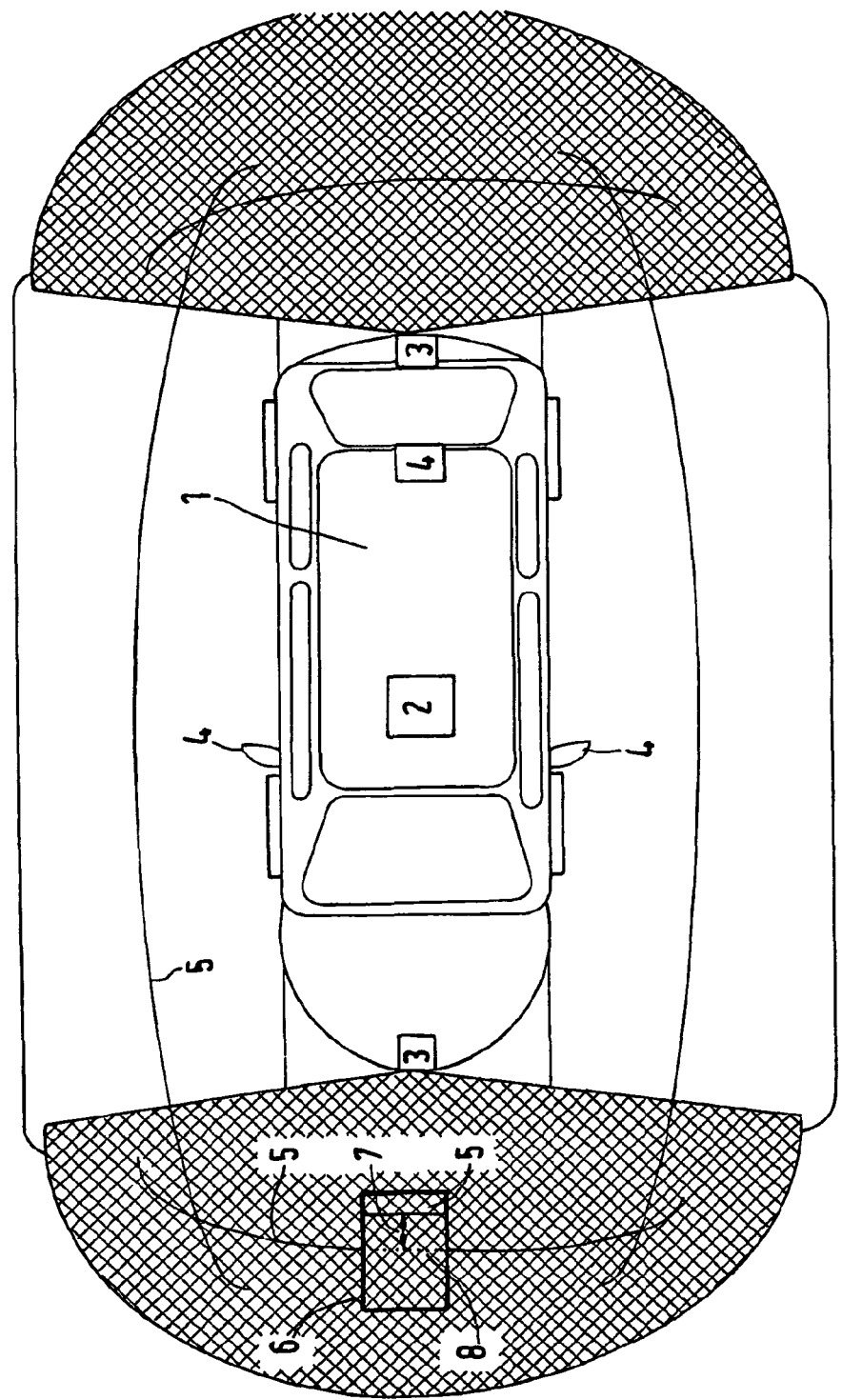
FIG. 3 is a schematic representation of a motor vehicle together with the safety with an obstacle.

FIG. 3 shows the motor vehicle 1 together with the safety ring 5 from FIG. 1 when approaching an obstacle 6. The image 5 of the radiation pattern changes as a result of the obstacle 6. The image 8 of the radiation pattern without an obstacle is again illustrated at this point by a broken line in order to illustrate the difference 7 between images of the radiation pattern detected in a chronologically successive order (sequentially-in-time).

An obstacle in a safety zone around the vehicle can therefore be recognized in that the distance between, for example, four lines drawn in the environment of the vehicle (or the width of a, for example, hatched rectangle) changes according to a certain regularity.

Figure 4:
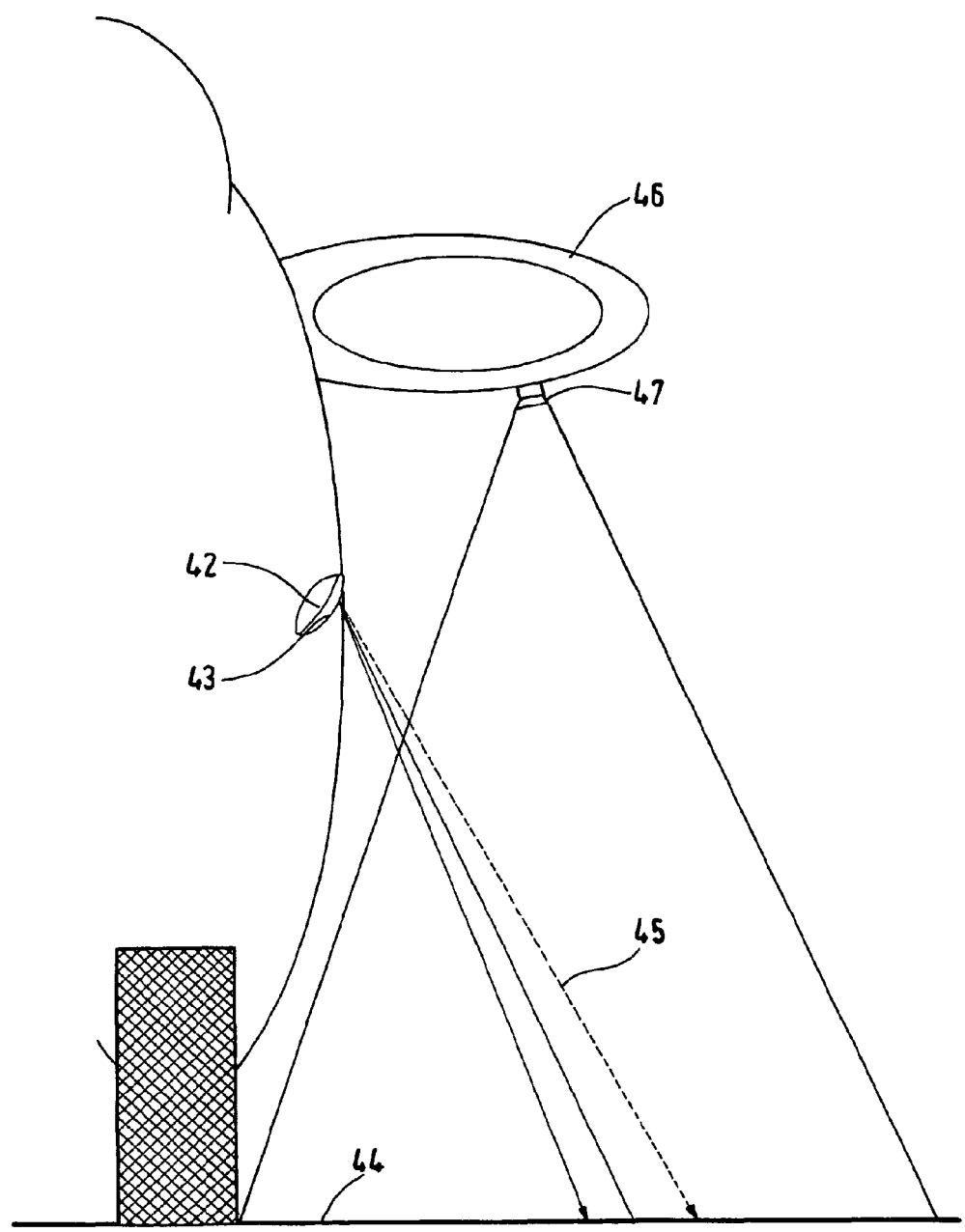
FIG. 4 is a simplified sectional view of a part of a motor vehicle together with a side mirror with an imaging device and a detecting device integrated therein.

FIG. 4 illustrates an imaging device 43 in the form of a laser, which is built into the door handle 42 of a vehicle together with a front end area lighting unit. The imaging device 43 has a special lens system which scatters the laser beam in one or two dimensions and thereby projects the image of a slightly curved line 45 into the driving path 44.

The top view camera 47 installed in the outside mirror 46 and its image processing unit is used as the detecting device. The detection angle of the camera is dimensioned such that the latter can also detect the image of the beams on the driving path when these are deformed by impinging on an obstacle or a pothole.

The imaging device 47 can also be based on a simple laser beam device, which is caused to carry out a rapid movement by way of an electromagnetically or piezo-electrically driven optical body or by way of a mirror element, so that the laser beam is displayed as a straight line or a line curved according to defined data, for example, along one vehicle side. In this case, a sufficiently rapidly movable laser point will appear to the human eye as well as for the detection by way of a camera as a continuous line or another predefined two-dimensional shape.

When detecting such an image, advantages are obtained in contrast to the classical object recognition by use of a camera. As a rule, the object to be recognized has to be sufficiently illuminated for successful automatic object recognition, has to contain edges or textures, or have certain characteristics which clearly deviate from the environment. In contrast, the automatic detection of a line shining in the infrared spectral region on the driving path or on obstacles according to the invention is easier to implement than the recognition or measuring of arbitrarily shaped objects, which are not known a priori and are arbitrarily colored. In contrast, the imaging of the lines can be carried out very easily. The images of the radiation patterns can be automatically differentiated from the remaining picture elements also in different illumination scenarios by way of segmentation. In the case of a geometrically cohesive shape, the implementation of the segmentation is clearly easier than, for example, in the case of individual points. Particularly, the reliability of the automatic recognition of a cohesive geometric shape is clearly greater than in the case of individual points because the recognized position of adjacent parts of the shape can be made mutually plausible by means of interpolation methods.

Since the line (imaging pattern) is subjected to certain local curvatures or displacements when impinging on the obstacles from the perspective of the detecting device, the extent of this curvature can be measured by way of a simple algorithm. The shape, intensity and position of the curvature (and, as required, the displacement) detected by the detecting device at one or more points in time permits a conclusion concerning the behavior and the relative speed of the obstacles including the lateral velocity relative to the vehicle.

Furthermore, the system can be used for the automatic orientation of the vehicle with respect to objects known a priori. When, for example, the garage entrance, a narrow passage way or the driver's usual parking space is provided with a special, clearly recognizable pattern, this can be unambiguously recognized by the system according to the invention. The pattern can, for example, be further developed as a relief, for example, in front of a garage, a narrow entry, etc., which causes an easily recognizable combination of curvatures, for example, of a line. This pattern can be stored in a storage device of the motor vehicle, for example, when driving through the narrow space for the first time, upon the actuation of an operating element. The obtained data concerning the position of the vehicle relative to the pattern can be used as information for the automatic orientation and/or for carrying out automated actions, for example, for an automatic entrance into the garage or a drive through narrow spaces.

A motor vehicle according to the invention can also be used for scanning the predefined information according to a bar coding principle. The bar coding can be arranged, for example, in front of the entrance to a gas station, an underground parking garage or an ecologically protected zone, for example, as a relief on the ground and can contain information with, for example, predefined settings for the vehicle or information for the driver, such as a speed limit. This information can be automatically taken over and processed and/or displayed by the motor vehicle according to the invention. In comparison to the known bar coding principle, the advantage consists of a largely free selection of the pattern and of the assignment of the desired settings, for example, by the vehicle user.

Figure 5:
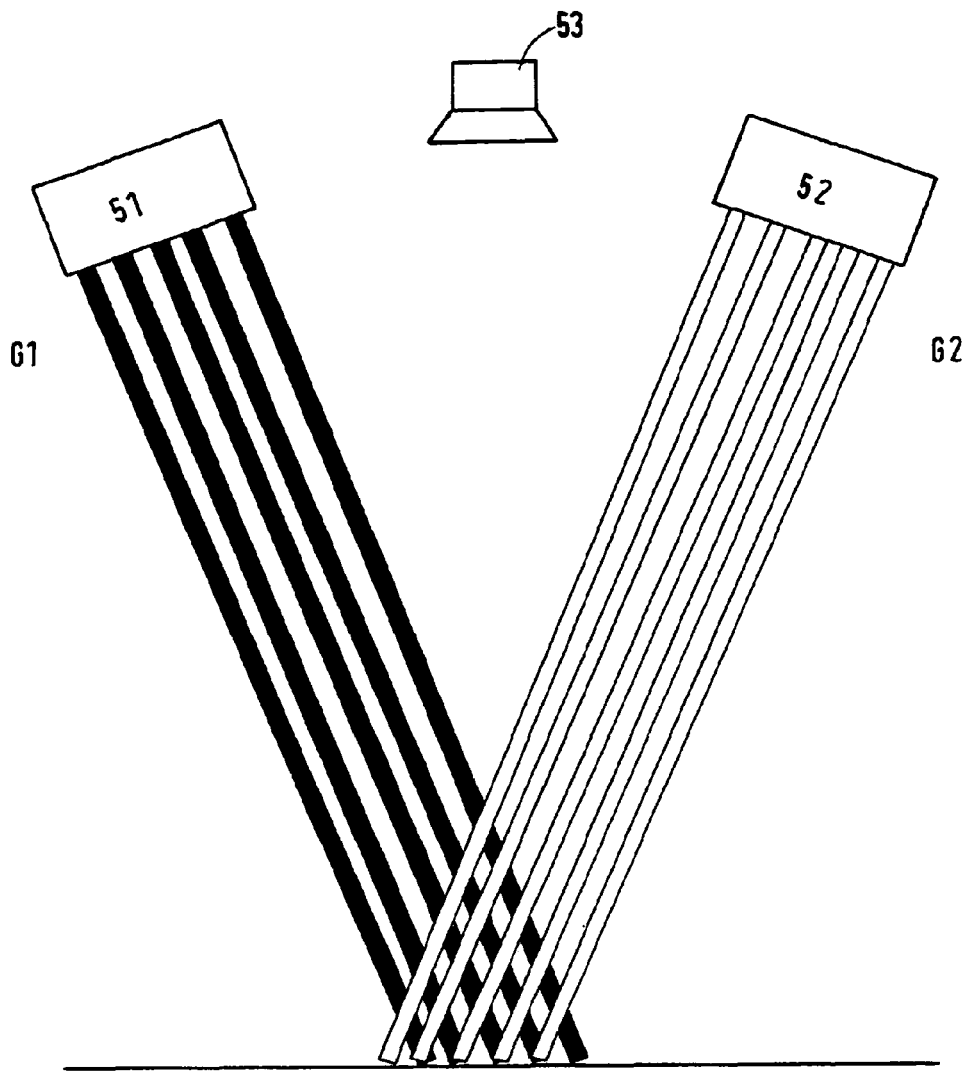
FIG. 5 is a view of radiation patterns superimposed on one another.

As another embodiment of the system according to the invention, as illustrated in FIG. 5, two radiation patterns consisting of slightly offset built-in positions 51 and 52 can be emitted as mutually engaging grids G1, G2 into the environment of the vehicle. By means of the image of the resulting pattern in the environment of a vehicle, for example, on an obstacle, the distance to the concerned parts of the environment can be computed.

In the case of this further development of the system according to the invention, the radiation patterns can be generated by means of LEDs, which are provided with a special mask, such as a grid structure.

In the case of this further development of the device according to the invention, mutually engaging grids can preferably be generated from colored strips, in which case the color and wavelength respectively of one grid differs from the wavelength of the other grid. These can therefore easily be differentiated by use of a camera system. The image of these two grids on an obstacle contains the information concerning the distance from this obstacle.

One or both of the above-described grids may also have a "negative" construction. This means that, for example, linear shadows are formed in an essentially illuminated surrounding field. A differentiation between illuminated and not illuminated areas of the surrounding field can be made by a very simple segmentation algorithm. When impinging on the obstacles, a shadow pattern is subjected to the same geometrical curvatures as a light pattern. The detection of these deformations can be used for locating and classifying the obstacles.

Particularly when automatically detecting colored (dyed) objects and surfaces with non-uniform reflection properties, there is the possibility that one of the colors or dyes (wavelengths) is reflected by the object only in a highly weakened manner.

In order to prevent the above, both imaging devices can, for example, cyclically switch their wavelengths, which the detecting device can, in turn, use for compensating the interfering reflection properties. This can be implemented, for example, by multicolor LEDs.

The position of the vehicle relative to the driving path can advantageously be computed by forming a long-term average value of the distance between vehicle parts, which contain the imaging device and the detecting device, and the driving path. By the formation of an average value of the distance from the driving path, for example, on a route of several kilometers, the short-term influences of the obstacles, which are detected during this time period, will have only a negligibly small influence on the average value. Greater deviations that are limited with respect to time can be excluded from the averaging. When the average value deviates from the desired value (which can be stored, for example, by use of reference data), a changed position of the vehicle relative to the plane of the driving path can be assumed. A changed position of the vehicle can occur, for example, because of tire pressure that is too low or because of other defects in the vehicle.

The information concerning a tire pressure that is, for example too low or not uniform can be displayed to the driver of the motor vehicle or can be taken into account in the algorithms for controlling the chassis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    an imaging device operatively configured to generate an image of a radiation pattern in an environment of the motor vehicle;
    a detecting device operatively configured for multiple, sequential detection of images of the radiation pattern influenced by the environment; and
    a processor operatively configured to detect an obstacle in the environment on the basis of a difference between images detected by the detecting device at different times or sequential images of the radiation pattern, wherein the processor is operatively arranged such that a radiation pattern assigned to the motor vehicle is recognized by a correspondence between the detected image and a generated image with respect to curvature.

2. The motor vehicle according to claim 1, wherein the imaging device is operatively arranged such that the image of the radiation pattern forms an essentially closed ring around the motor vehicle.

3. The motor vehicle according to claim 1, wherein at least one of the imaging device and the detecting device is at least partially arranged in a door handle of the motor vehicle.

4. The motor vehicle according to claim 3, wherein the at least one of the imaging device and the detecting device is at least partially arranged in the door handle of the motor vehicle together with a vehicle front end area lighting unit.

5. The motor vehicle according to claim 1, wherein the imaging device is at least partially arranged in a decorative element of the motor vehicle.

6. The motor vehicle according to claim 3, wherein the imaging device is at least partially arranged in a decorative element of the motor vehicle.

7. The motor vehicle according to claim 1, wherein the detecting device is arranged in a side mirror of the motor vehicle.

8. The motor vehicle according to claim 7, further comprising at least one of a top view camera, a backup camera, and a forward direction camera, said at least one camera being arranged in the side mirror of the motor vehicle with the detecting device.

9. The motor vehicle according to claim 1, wherein, when the motor vehicle is stationary, the processor device detects a theft threat based on a difference between the sequential images of the radiation pattern and generates a corresponding warning signal.

10. The motor vehicle according to claim 1, wherein the radiation pattern is generated by two partial imaging devices, each partial imaging device generating a partial radiation pattern having several parallel lines which are mutually superimposed.

11. The motor vehicle according to claim 1, further comprising:
    a side mirror of the motor vehicle in which at least of the imaging device and the detecting device is integrated; and
    wherein the processor detects an obstacle hindering opening of a vehicle door based on a difference between sequential images of the radiation pattern.

12. The motor vehicle according to claim 1, wherein a time period between successive generating of the images of the radiation pattern and sequential detecting of the images of the radiation pattern influenced by the environment is a function of vehicle movement.

13. The motor vehicle according to claim 1, wherein the processor recognizes an obstacle based on a comparison of a displacement of the image of the radiation pattern and a displacement of other textures and/or edges in the image detected by the detecting device.

14. The motor vehicle according to claim 1, wherein information concerning the vehicle environment is obtained based on the sequentially detected images of the radiation pattern, a time period between successive detection of the images, and vehicle movement.

15. The motor vehicle according to claim 1, wherein the processor automatically classifies an obstacle based on the sequentially detected images of the radiation pattern.

16. The motor vehicle according to claim 1, wherein, as a function of an obstacle recognized in the environment and/or of a recognized obstacle class, an automatic change of vehicle dynamics of the motor vehicle occurs.

17. The motor vehicle according to claim 16, wherein the automatic change of the vehicle dynamics comprises at least one of a braking operation and an evasive maneuver operation.

* * * * *